United States Patent
Nagatani et al.

(10) Patent No.: US 11,003,177 B2
(45) Date of Patent: May 11, 2021

(54) APPARATUS AND METHOD FOR GENERATING ROBOT PROGRAM

(71) Applicant: Mitsubishi Electric Corporation, Tokyo (JP)

(72) Inventors: Tatsuya Nagatani, Tokyo (JP); Haruhisa Okuda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 52 days.

(21) Appl. No.: 16/483,040

(22) PCT Filed: Sep. 4, 2017

(86) PCT No.: PCT/JP2017/031706
§ 371 (c)(1),
(2) Date: Aug. 2, 2019

(87) PCT Pub. No.: WO2018/173318
PCT Pub. Date: Sep. 27, 2018

(65) Prior Publication Data
US 2020/0233407 A1   Jul. 23, 2020

(30) Foreign Application Priority Data
Mar. 24, 2017 (JP) .............................. JP2017-059621

(51) Int. Cl.
G05B 19/423 (2006.01)
B25J 9/16 (2006.01)
B25J 9/00 (2006.01)

(52) U.S. Cl.
CPC .......... G05B 19/423 (2013.01); B25J 9/0081 (2013.01); B25J 9/1612 (2013.01); B25J 9/1664 (2013.01);
(Continued)

(58) Field of Classification Search
CPC .............. G05B 19/423; B25J 9/00; B25J 9/16
See application file for complete search history.

(56) References Cited

U.S. PATENT DOCUMENTS

| | | | |
|---|---|---|---|
| 9,227,323 B1* | 1/2016 | Konolige | B25J 9/1694 |
| 9,333,649 B1* | 5/2016 | Bradski | G06T 7/60 |
| 2011/0010009 A1* | 1/2011 | Saito | B25J 9/1612 |
| | | | 700/253 |
| 2013/0054025 A1* | 2/2013 | Ito | B25J 9/1697 |
| | | | 700/246 |

(Continued)

FOREIGN PATENT DOCUMENTS

| | | |
|---|---|---|
| CN | 103659811 A | 3/2014 |
| CN | 103687702 A | 3/2014 |

(Continued)

OTHER PUBLICATIONS

Weiwei Wan et al "Integrated assembly and motion planning using regrasp graphs"; 11 pages (Year: 2016).*

(Continued)

*Primary Examiner* — Kira Nguyen
(74) *Attorney, Agent, or Firm* — Xsensus LLP

(57) ABSTRACT

An apparatus including a combination possibility calculation unit to calculate a stable orientation in which, from three-dimensional shape data of a part, the part is stabilized on a flat surface, to calculate a grasping method for grasping the part with a hand, and to calculate a combination in which the hand does not interfere from system configuration data including information on a connection destination of the hand and a combination group of the grasping method and the stable orientation; a regrasping path calculation unit to calculate a regrasping path of the part by using the calculated combination; a path group calculation unit to calculate a path having the minimum number of teaching points from the regrasping path as a path group based on orientation data for designating an input orientation and an alignment orientation of the part; and a program generation unit to generate a program of a robot based on the path group.

11 Claims, 10 Drawing Sheets

(52) U.S. Cl.
CPC .............. *G05B 2219/39476* (2013.01); *G05B 2219/39484* (2013.01); *G05B 2219/39536* (2013.01); *G05B 2219/39542* (2013.01)

(56) References Cited

U.S. PATENT DOCUMENTS

| | | | |
|---|---|---|---|
| 2013/0184870 A1* | 7/2013 | Ota | B25J 9/1669 700/262 |
| 2013/0211593 A1* | 8/2013 | Domae | B25J 9/1612 700/258 |
| 2014/0074288 A1 | 3/2014 | Satou | |
| 2014/0147240 A1 | 5/2014 | Noda et al. | |
| 2015/0120054 A1 | 4/2015 | Watanabe | |
| 2015/0217451 A1* | 8/2015 | Harada | B25J 9/1697 700/253 |
| 2016/0167228 A1* | 6/2016 | Wellman | B25J 9/1697 700/218 |

FOREIGN PATENT DOCUMENTS

| | | | | |
|---|---|---|---|---|
| DE | 102007060653 A1 * | 6/2009 | | B25J 9/1697 |
| DE | 10 2013 018 222 A1 | 4/2014 | | |
| DE | 11 2012 002 677 T9 | 7/2014 | | |
| EP | 2 263 837 B1 | 6/2013 | | |
| JP | 10-138185 A | 5/1998 | | |
| JP | 2000-10618 A | 1/2000 | | |
| JP | 2009-56513 A | 3/2009 | | |
| JP | 2013-43271 A | 3/2013 | | |
| JP | 2015-44274 A | 3/2015 | | |
| JP | 2015-54378 A | 3/2015 | | |
| JP | 2015-58492 A | 3/2015 | | |

OTHER PUBLICATIONS

International Search Report and Written Opinion dated Nov. 21, 2017 for PCT/JP2017/031706 filed on Sep. 4, 2017, 13 pages including English Translation of the International Search Report.

Office Action received for the Taiwanese Patent Application No. 107103806 dated Apr. 16, 2018, 19 pages including English Translation.

Office Action received for Japanese Patent Application No. 2018-514923 dated Apr. 24, 2018, 7 pages including English Translation.

Office Action dated Feb. 4, 2021 in German Patent Application No. 11 2017 007 311.1, 12 pages.

* cited by examiner

FIG. 4

| | | ROBOT | | | REGRASPING JIG | | ALIGNMENT STAND STABLE ORIENTATION | | |
|---|---|---|---|---|---|---|---|---|---|
| | | GRASPING METHOD 1 | GRASPING METHOD 2 | GRASPING METHOD 3 | GRASPING METHOD 4 | GRASPING METHOD 5 | STABLE ORIENTATION 1 | STABLE ORIENTATION 2 | STABLE ORIENTATION 3 |
| ROBOT | GRASPING METHOD 1 | – | – | – | O | – | O | × | × |
| | GRASPING METHOD 2 | – | – | – | O | O | × | × | O |
| | GRASPING METHOD 3 | – | – | – | × | O | O | O | × |
| | GRASPING METHOD 4 | O | O | × | – | – | – | – | – |
| | GRASPING METHOD 5 | × | O | O | – | – | – | – | – |
| REGRASPING JIG | STABLE ORIENTATION 1 | O | × | O | – | – | – | – | – |
| TEMPORARY PLACING STAND STABLE ORIENTATION | STABLE ORIENTATION 2 | × | × | O | – | – | – | – | – |
| | STABLE ORIENTATION 3 | × | O | × | – | – | – | – | – |

FIG. 5

| | | ROBOT | | | REGRASPING JIG | | ALIGNMENT STAND STABLE ORIENTATION | | |
|---|---|---|---|---|---|---|---|---|---|
| | | GRASPING METHOD 1 | GRASPING METHOD 2 | GRASPING METHOD 3 | GRASPING METHOD 4 | GRASPING METHOD 5 | STABLE ORIENTATION 1 | STABLE ORIENTATION 2 | STABLE ORIENTATION 3 |
| ROBOT | GRASPING METHOD 1 | 0 | 2 | 4 | 1 | 3 | 1 | 5 | 3 |
| | GRASPING METHOD 2 | 2 | 0 | 2 | 1 | 1 | 3 | 3 | 1 |
| | GRASPING METHOD 3 | 4 | 2 | 0 | 3 | 1 | 1 | 1 | 3 |
| | GRASPING METHOD 4 | 1 | 1 | 3 | 0 | 2 | 2 | 4 | 2 |
| | GRASPING METHOD 5 | 3 | 1 | 1 | 2 | 0 | 2 | 2 | 2 |
| REGRASPING JIG | STABLE ORIENTATION 1 | 1 | 3 | 1 | 2 | 2 | 2 | 2 | 4 |
| | STABLE ORIENTATION 2 | 5 | 3 | 1 | 4 | 2 | 2 | 2 | 4 |
| TEMPORARY PLACING STAND STABLE ORIENTATION | STABLE ORIENTATION 2 | 3 | 1 | 3 | 2 | 2 | 4 | 4 | 2 |

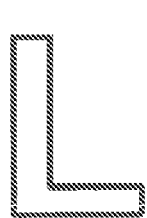 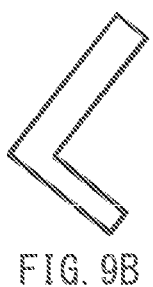 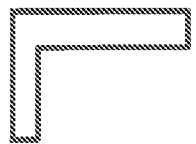 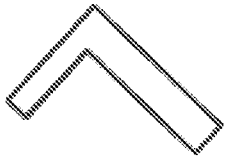 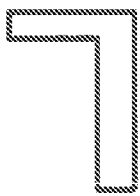
FIG. 9A     FIG. 9B     FIG. 9C     FIG. 9D     FIG. 9E
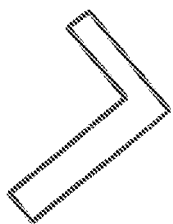 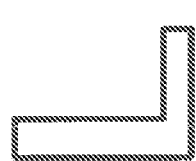 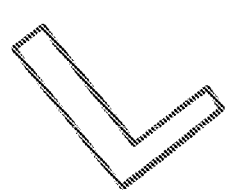 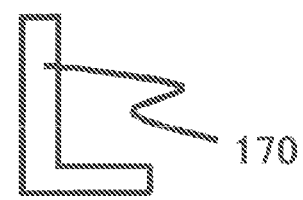
FIG. 9F     FIG. 9G     FIG. 9H     FIG. 9I

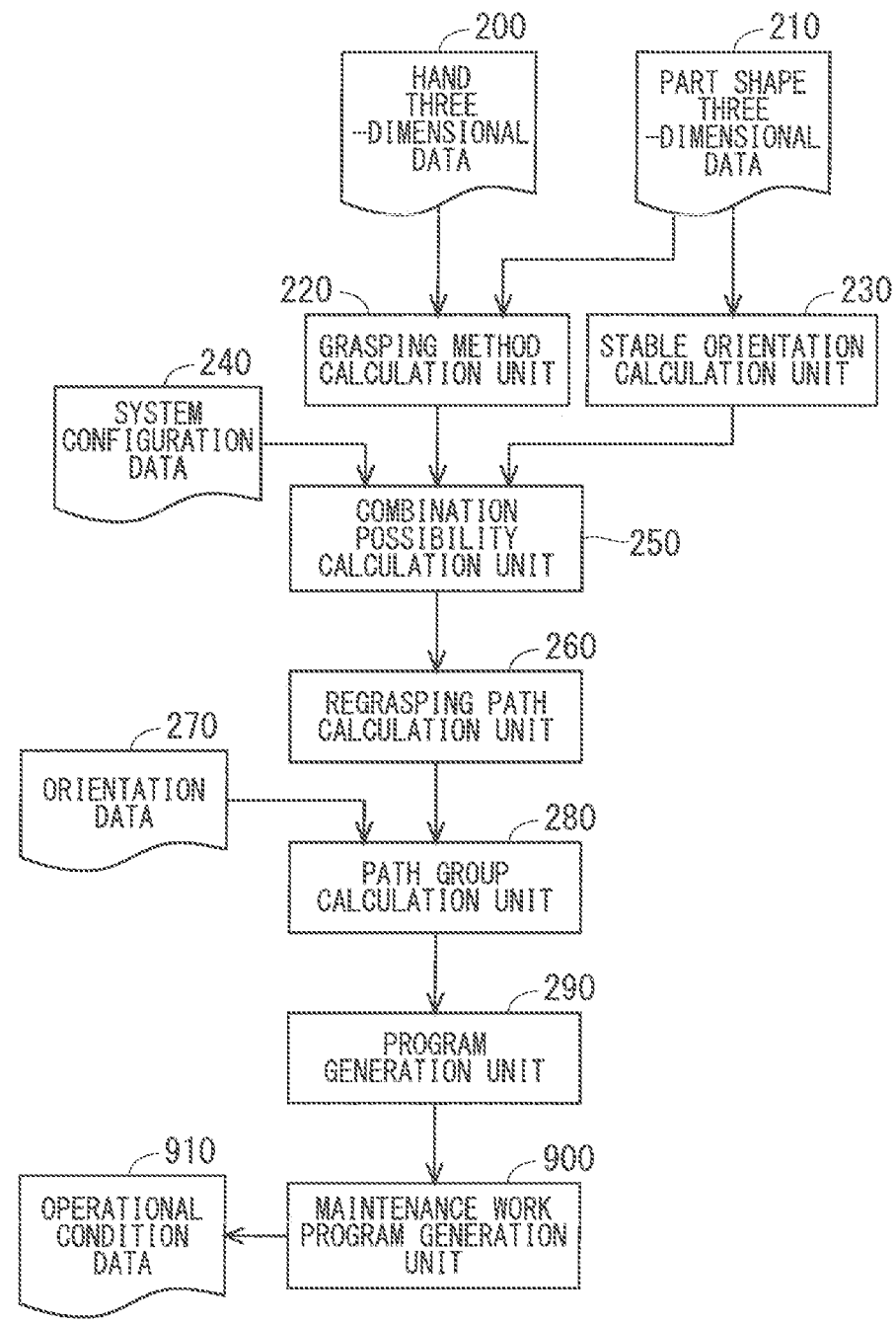

APPARATUS AND METHOD FOR GENERATING ROBOT PROGRAM

CROSS-REFERENCE TO RELATED APPLICATIONS

The present application is based on PCT filing PCT/JP2017/031706, Sep. 4, 2017, which claims priority to JP 2017-059621, filed Mar. 24, 2017, the entire contents of each are incorporated herein by reference.

TECHNICAL FIELD

The present invention relates to an apparatus and method for generating a program for an industrial robot, and in particular, for generating a program aligning parts supplied in bulk by using a robot.

BACKGROUND ART

As a conventional method for generating a program for an industrial robot, a method of outputting a robot program of three-dimensionally measuring a movement path of parts demonstrated by the operator, and moving parts along the movement path is known. At the time of program output, in consideration of the physicality of the robot, it is also determined whether the path can be achieved. In addition, when it is not possible to achieve movement with a single robot, regrasping with a plurality of arms is also output as a candidate for a program (Patent Document 1).

There is also known a method for generating a program for searching for a movement path of parts in a two-dimensional plane. The work area is expressed in two dimensions viewed from above, and divided into areas of appropriate size. The initial position and the final position of parts are selected from the divided areas. The reachability of the robot arm is determined in each area, and the area, reachable by the robot arm, continuous from the initial position to the final position is extracted as a movement path. When the movement path cannot be found by one robot arm, regrasping of parts are performed between a plurality of robot arms (Patent Document 2).

PRIOR ART DOCUMENTS

Patent Documents

Patent Document 1: Japanese Patent Application Laid-Open No. 2015-054378
Patent Document 2: Japanese Patent Application Laid-Open No. 2015-058492

SUMMARY

Problem to be Solved by the Invention

In a method for generating such a program, robot teaching operations are required for each movement path. In an industrial robot, it is necessary to perform actual matching called teaching to set the target position of movement as a teaching point. Depending on the shapes of the robot hand and parts, this teaching operation is an operation that requires an accuracy of 1 mm or less. In addition, it is necessary to perform matching with 6 degrees of freedom when the orientation of the robot hand is included, which is a time-consuming and troublesome work when setting and confirmation are combined. Even in work using a vision sensor, in general, the basic grasping method is set by teaching.

On the other hand, even in the case of setting a plurality of movement paths, there is a problem that the load of teaching work is desired to be reduced by making teaching points common. In particular, in robot systems in recent years, since it is also required to cope parts supplied in bulk and there are a plurality of orientations and grasping methods of parts, the number of movement paths has increased.

The present invention has been made to solve the above problems, and generates a robot program for making teaching points common to the parts supplied in a plurality of orientations in the movement path for each orientation.

Means to Solve the Problem

An apparatus for generating a robot program according to the present invention includes: a stable orientation calculation unit to calculate a stable orientation in which, from three-dimensional shape data of a part, the part is stabilized on a flat surface; a grasping method calculation unit to calculate a grasping method for grasping the part with a hand from three-dimensional data of the hand and the three-dimensional shape data; from a combination group of the grasping method by the robot, the grasping method by other than the robot, and the stable orientation, based on system configuration data including information on a connection destination of the hand, the stable orientation, and the grasping method, a combination possibility calculation unit to calculate the combination in which the hand does not interfere; a regrasping path calculation unit to calculate a regrasping path of the part by using the combination calculated by the combination possibility calculation unit; a path group calculation unit to calculate a path having the minimum number of teaching points from the regrasping path as a path group based on orientation data for designating an input orientation and an alignment orientation of the part; and a program generation unit to generate a program of the robot based on the path group.

In addition, a method for generating a robot program according to the present invention includes: a stable orientation calculation step of calculating a plurality of stable orientations in which, from three-dimensional shape data of a part, the part is stabilized on a flat surface; a grasping method calculation step of calculating a grasping method for grasping the part with a hand from three-dimensional data of the hand and the three-dimensional shape data; from a combination group of the grasping method by the robot, the grasping method by other than the robot, and the stable orientation, based on system configuration data including information on a connection destination of the hand, the stable orientation, and the grasping method, a combination possibility calculation step of calculating the combination in which the hand does not interfere; a regrasping path calculation step of calculating a regrasping path of the part by using the combination calculated by the combination possibility calculation step; a path group calculation step of calculating a path having the minimum number of teaching points from the regrasping path as a path group based on orientation data for designating an input orientation and an alignment orientation of the part; and a program generation step of generating a program of a robot based on the path group.

Effects of the Invention

According to the present invention, it is possible to generate a robot program with a small number of teaching points in which the teaching points are shared among a plurality of movement paths.

BRIEF DESCRIPTION OF DRAWINGS

FIG. 4 is a diagram illustrating an example of a combination possibility result output by a combination possibility calculation unit according to the first embodiment of the present invention.

FIG. 5 is a diagram illustrating an example of a combination for illustrating the number of movements according to the first embodiment of the present invention.

FIGS. 9A to 9I are diagrams illustrating an example of a part at a work position serving as a flat surface.

FIG. 11 is a functional configuration diagram of a program generation apparatus according to a fifth embodiment of the present invention.

DESCRIPTION OF EMBODIMENTS

First Embodiment

Figure 1:
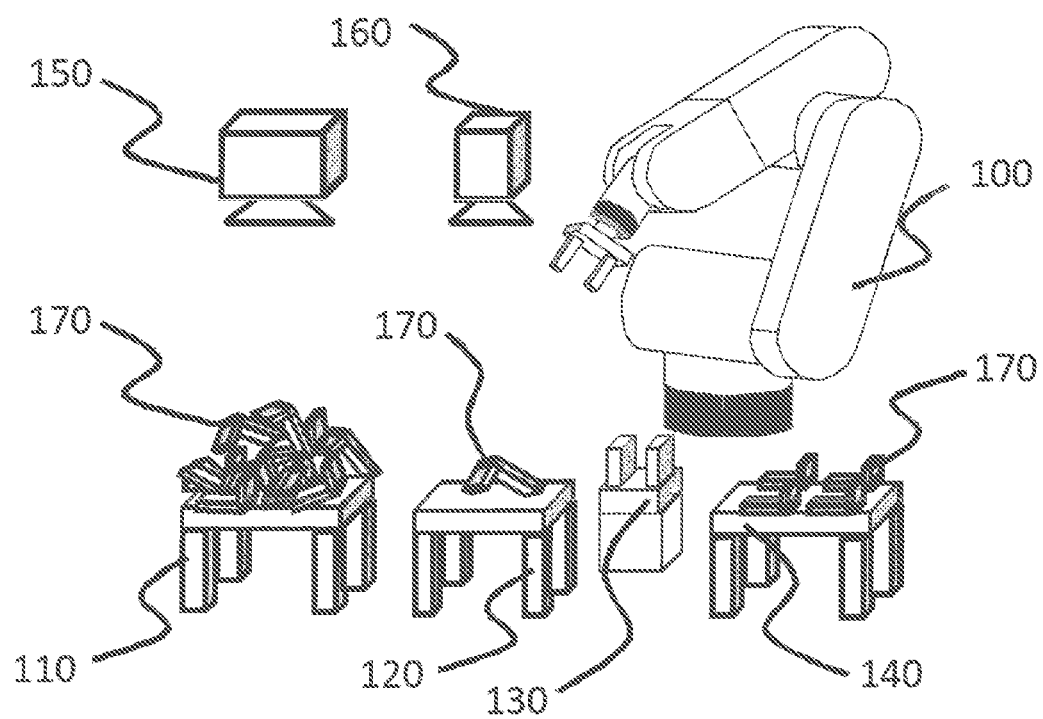
FIG. 1 is a configuration diagram of an example of a robot system according to a first embodiment of the present invention.

FIG. 1 is a schematic view of an example of a robot system for aligning parts 170 loaded in bulk, which is a typical application of the present invention. The robot 100 is widely used in the vertical articulated robot 100. The parts supply stand 110 is a stand onto which the parts 170 loaded in bulk are supplied. As the parts supply method, in addition to the method in which the parts 170 are sequentially supplied to a pallet fixed to the parts supply stand 110, there are a method of replacing in units of pallets in which the parts 170 are packed, and a combined method thereof.

From the parts supply stand 110, only one part 170 is taken out to the temporary placing stand 120 by using the recognition result of the three-dimensional vision sensor 150. As a method of taking out, a method is known in which deriving an area into which the fingers of the robot hand (sometimes simply referred to as a "hand")can be inserted to insert the fingers into the insertable area to close the fingers grasps and takes out the parts 170. Another method is to calculate the grasping position from the position orientation of all or part of the characteristic parts of the parts 170. Here, if the parts 170 can be placed on the temporary placing stand 120 in a state where the parts 170 are not in contact with each other from a state of being loaded in bulk in which the parts 170 on the parts supply stand 110 are in contact with each other, any means may be used. Here, the position orientation is a technical term in the robot field meaning position and orientation, and means to set a rigid body in a three-dimensional space. For example, the position is set as one representative point such as the center of gravity, and is expressed by coordinate values. The orientation can be determined by, for example, a rotational transformation matrix.

When the part 170 is placed on a flat surface on the temporary placing stand 120, the orientation of the part 170 is stabilized in any one orientation of a finite number of orientation patterns except for special part shapes. Here, the special part shape refers to a part 170 having a shape capable of continuously changing its orientation without changing the contact area, and for example, a part 170 having a shape that stabilizes with a spherical surface or cylindrical side surface being grounded. Since the orientations of the part shape placed on the flat surface of the temporary placing stand 120 is limited to a finite number, and the height of the part 170 is also constant for each orientation of the part shape, the two-dimensional vision sensor 160 can recognize the position orientation.

Thereafter, the two-dimensional vision sensor 160 recognizes the position orientation of the part 170 with high accuracy, and the robot 100 moves the part 170 to the final orientation of the predetermined part 170 on the alignment stand 140. If it is not possible to directly move the part 170 to the alignment stand 140 in the final orientation because of the grasping method, the robot 100 regrasps and then moves the part 170 to the alignment stand 140 so that the part 170 is in the final orientation by using the regrasping jig 130 capable of grasping the part 170. It should be noted that in addition to using the regrasping jig, 130, the part 170 may be replaced on the temporary placing stand 120 and regrasped.

Figure 2:
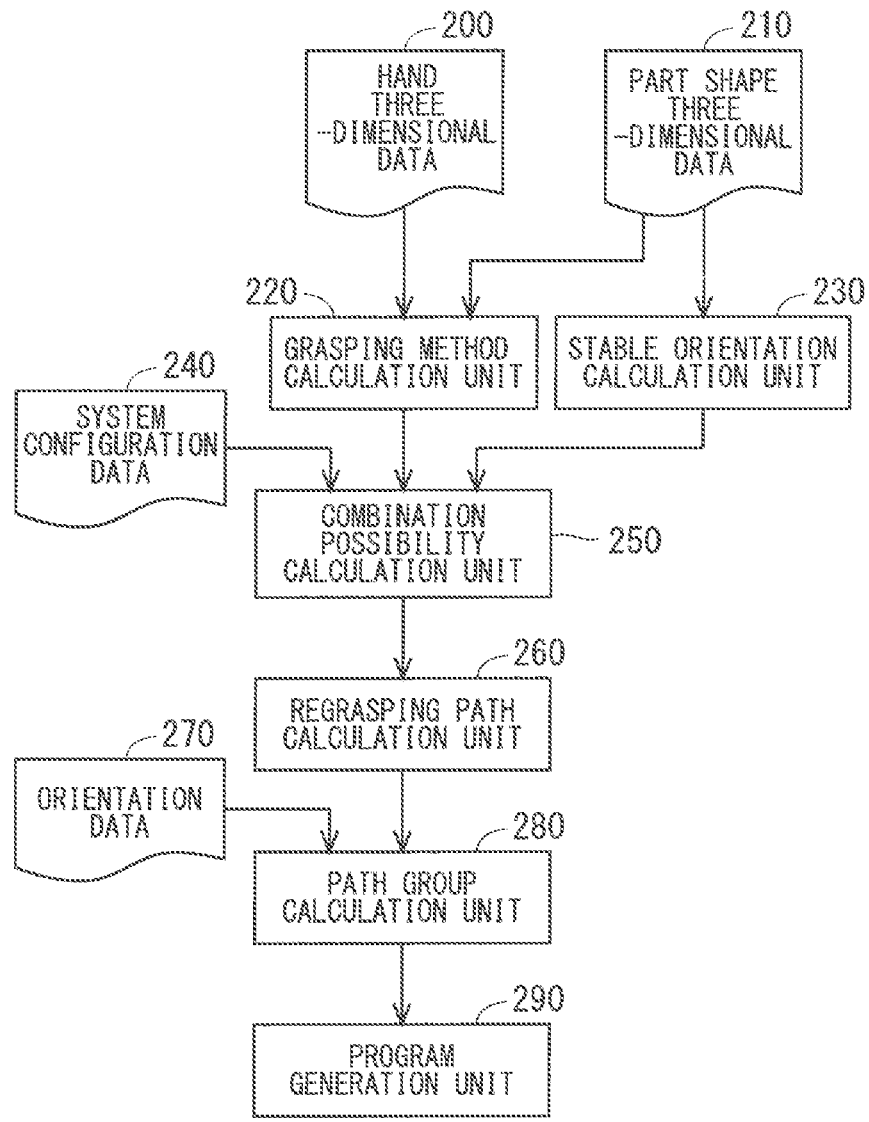
FIG. 2 is a functional configuration diagram of a program generation apparatus according to the first embodiment of the present invention.

FIG. 2 is a functional configuration diagram of a program generation apparatus according to the first embodiment. The hand three-dimensional data 200 includes three-dimensional data relating to the shape of the hand for grasping the part 170. such as the robot hand and the regrasping jig 130 used in the target system. Here, the hand three-dimensional data 200 may include additional information on the hand such as designation of the gripper of the hand, movement direction of the finger, and orientation of the hand.

Figure 3:
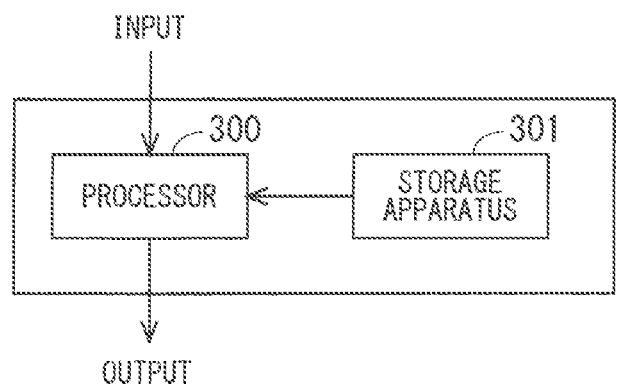
FIG. 3 is a diagram for illustrating a hardware configuration of the present invention.

The part shape three-dimensional data 210 includes three-dimensional data relating to the shape of the part 170 handled by the target system. This may also include additional information on the part 170, such as the graspable area of the part 170. FIG. 3 is a diagram for illustrating a hardware configuration. The hand three-dimensional data 200 and the part shape three-dimensional data 210 are databases, and are stored in a storage apparatus 301 such as a hard disk. For example, the input is a grasping method based on the teaching by the operator.

The grasping method calculation unit 220 calculates the grasping method of the part 170 with each hand from the hand three-dimensional data 200 and the part shape three-dimensional data 210, and outputs the grasping method. As a method of calculating the grasping method of the part 170, various methods have been proposed, such as a method of checking whether or not the center of gravity position exists in the area surrounded by the contact points of the hand and the part 170. In addition, the grasping method calculation unit 220 may calculate the grasping method according to an input from the operator. As a method of causing the operator to input, there is a method of providing a three-dimensional display of the part 170 and the hand, and a piece of movement means of the hand in the three-dimensional display. In any of the methods, the grasping method calculation unit 220 outputs the grasping method of the part 170 in each hand from the input of the hand three-dimensional data 200 and the part shape three-dimensional data 210. Thus, the grasping method calculation unit 220 calculates one or more grasping methods for grasping the part 170 with the hand from the three-dimensional data on the hand of the robot 100 and the three-dimensional shape data. It should be noted that the grasping method is not only a concept in a narrow sense such as a method of grasping the part 170, but so a concept in a broad sense including the hand taking an appropriate grasping orientation by grasping the part 170. Therefore, the grasping method also includes a concept of grasping orientation as a technical term throughout the entire text.

The stable orientation calculation unit 230 calculates all stable orientations when the part 170 is placed on a flat surface from the part shape three-dimensional data 210, and outputs the calculated result as part stable orientation data. The stable orientation calculation unit 230 calculates a plurality of stable orientations. As a calculation method of the stable orientation, there is a method in which, for example, a minimal volume convex polyhedron surrounding the part 170 is derived, and when the center of gravity is projected onto a flat surface including each surface, if the projected point is in the surface of the convex polyhedron, a stable orientation is obtained. Here, the stable orientation is an orientation in which the part 170 can maintain static stability. If all pieces of the part stable orientation data that the part 170 can take are output from the part shape three-dimensional data 210, any method may be used. Thus, the stable orientation calculation unit 230 calculates the stable orientation in which the part 170 is stable on the flat surface from the three-dimensional shape data on the part 170.

The system configuration data 240 includes at least information on the equipment to which the hand is connected, and may include information on the other side which each piece of equipment can access, and further, constraints and the like due to the environment of the work place. For example, the hand attached to the robot 100 can access all pieces of equipment such as the parts supply stand 110, the temporary placing stand 120, the regrasping jig 130, and the alignment stand 140. On the other hand, the hand attached to the regrasping jig 130 cannot access the other equipment, needs to be accessed from the hand attached to the robot 100. The system configuration data 240 is a database and is stored in the storage apparatus 301.

The combination possibility calculation unit 250 will be described. A grasping method of the part 170 with the hand from the grasping method calculation unit 220, all pieces of part stable orientation data that the part 170 can take from the stable orientation calculation unit 230, and information on equipment to which the hand is connected from the system configuration data 240 are input into the combination possibility calculation unit 250. The combination possibility calculation unit 250 calculates regrasping feasibility in the combination of the grasping method of the robot 100 and the regrasping jig 130 and grasping feasibility in the combination of the grasping method and the stable orientation of the robot 100 to output the calculated result as the combination possibility result.

In the calculation of the regrasping feasibility, if the two hands do not interfere with each other in the combination of the grasping method of the hand connected to the robot 100 and the grasping method of the hand connected to the regrasping jig 130, it is determined that the regrasping is possible. Conversely, when the hands interfere with each other, it is determined that the regrasping is "impossible". In addition, in the calculation of the grasping feasibility, in the combination of the grasping method of the hand connected to the robot 100 and the stable orientation, if the hand does not interfere with the flat surface on which the part 170 is grounded, it is determined that the grasping is possible. Conversely, in the case of interference, it is determined that the grasping is "impossible". In the combination of the stable orientation and the grasping method determined to be graspable, it is also possible to place the part 170 in the stable orientation by using the grasping method. Thus, the combination possibility calculation unit 250 calculates one or more combinations in which the hands do not interfere based on the system configuration data 240 including information on the connection destination of the hand, the stable orientation, and the grasping method from the combination group of any one of the stable orientation and the grasping method and the grasping method. In other words, the combination possibility calculation unit 250 calculates a combination in which the hands do not interfere from the combination of any one of the stable orientation and the grasping method and the grasping method.

FIG. 4 is a diagram illustrating an example of the combination possibility result output by the combination possibility calculation unit 250. It is shown whether or not the regrasping of the part 170 from the state described in the row to the state described in the column, that is, the movement of the part 170, can be directly performed. The grasping methods 1, 2, and 3 are grasping methods of the hand connected to the robot 100, and the grasping methods 4 and 5 are grasping methods of the hand connected to the regrasping jig 130. The stable orientations 1, 2, and 3 are stable orientations of the part 170 on the flat surface, and are common to the temporary placing stand 120 and the alignment stand 140.

Here, a robot including one robot 100 having one arm is assumed. The sixth to eighth rows represent the case where the robot 100 grasps the part 170 from the temporary placing stand 120, and the sixth to eighth columns represent the case where the robot 100 places the part 170 on the alignment stand 140. It should be noted that, for example, when there are two robots 100, the two robots 100 are distinguished, and a grasping method corresponding to the added robot 100 is added.

Between the grasping method of the robot 100 and the grasping method of the regrasping jig 130, the combination capable of directly regrasping the part 170 is set as "○", and the combination incapable of directly regrasping the part 170 due to interference is set as "×". In addition, in the combination of the grasping method of the robot 100 and the stable orientation of the temporary placing stand 120 or the alignment stand 140, a combination capable of directly grasping the part 170 is set as "○", and the combination incapable of directly grasping the part 170 due to interference with the flat surface is set as "×".

For example, when there are a plurality of robots 100, the part 170 may be directly regrasped between the plurality of robots 100. More specifically, if the part 170 can be directly regrasped without interference between the grasping method A of one robot 100 and the grasping method B of the other robot, "○" will be set. Similarly, even in the case of one robot 100, when there are a plurality of arms, the grasping method is defined for each arm.

In addition, although there may be a plurality of regrasping jigs 130, the grasping method of a regrasping jig 130 cannot be directly changed. Furthermore, it is impossible to move directly from the state in which the part 170 is grasped by the regrasping jig 130 to the stable orientation of the alignment stand 140. Similarly, the part 170 placed on the temporary placing stand 120 does not directly move to the regrasping jig 130 or the alignment stand 140. From the above, all of the fourth row and the fourth column to the eighth row and the eighth column are set as "−". In this way, even if capable of being considered as a combination, the case where the part 170 cannot be directly regrasped, that is, the part 170 cannot be directly moved without being regrasped is displayed as "×", and the case where there is no meaning as a combination is displayed as "−".

In addition, not only the interference between hands at the time of grasping, but also the interference at the time of movement before grasping may be taken into consideration. The movement includes, for example, the opening and closing of the claws of the hand, and the movement of the hand to the grasping position. The movement direction to the grasping position is simply the direction from the base to the tip of the hand, but in addition to that, may be set by the operator.

From the combination possibility result output by the combination possibility calculation unit 250, in the paths where one of each combination is in the initial state and the other is in the final state, the regrasping path calculation unit 260 calculate all the paths with the smallest number of movements to output the calculated result as a regrasping path group.

FIG. 5 is a diagram illustrating an example of a combination for illustrating the number of movements according to the first embodiment. More specifically, FIG. 5 is a diagram summarizing the minimum number of movements of the part 170 to be calculated by the regrasping path calculation unit 260 in the combination of the grasping method and the stable orientation. The item in row i and column j expresses the minimum number of movements from the state of i to the state of j. The sixth to eighth rows represent the movement from the stable orientation of the temporary placing stand 120, and the sixth to eighth columns represent the movement to the stable orientation of the alignment stand 140.

Here, how to count the number of movements in FIG. 5 will be described. When FIG. 4 and FIG. 5 are compared, since the portion where the combination is "○" in FIG. 4 can be directly moved without the part 170 being regrasped, all the number of movements is one in FIG. 5. In addition, in the case of the same grasping method such as from the grasping method 1 to the grasping method 1, since the part 170 is not moved, the number of movements is zero. On the other hand, in the combination from the stable orientation 1 of the temporary placing stand 120 to the stable orientation 1 of the alignment stand 140 (portion of "−" in FIG. 4), since the part 170 can be moved by passing through the portion where the combination is "○" in FIG. 4 twice, for example, from the stable orientation 1 of the temporary placing stand 120 to the grasping method 1 and then from grasping method 1 to the stable orientation 1 of the alignment stand 140, the number of movements is two. Furthermore, even in the portion being "×" in FIG. 4, the part 170 can be moved by passing the combination (path) being "○" a plurality of times.

For example, since the first row and the second column leads from the grasping method 1 to the grasping method 4 and from the grasping method 4 to the grasping method 2, the number of movements is two. Since the sixth row and the sixth column leads from the stable orientation 1 of the temporary placing stand 120 to the grasping method 1 and from the grasping method 1 to the stable orientation 1 of the alignment stand 140, the number of movements is two. Since the sixth row and the eighth column leads from the stable orientation 1 of the temporary placing stand 120 to the grasping method 1, from the grasping method 1 to the grasping method 4, from the grasping method 4 to the grasping method 2, and from the grasping method 2 to the stable orientation 3 of the alignment stand 140, the number of movements is four. As described above, how to count the number of movements is the minimum number of combinations (paths) of "○" in FIG. 4.

There are a plurality of paths for achieving the minimum number of movements. For example, in addition to the above, since the sixth row and the eighth column leads from the stable orientation 1 of the temporary placing stand 120, sequentially through the grasping method 3, the grasping method 5, and the grasping method 2, to the stable orientation 3 of the alignment stand 140, although the path is different, the number of movements is the same four. The regrasping path calculation unit 260 calculates all the paths having the minimum number of movements in the combination of all the initial states and the final states, and outputs the calculated result as a regrasping path group.

Here, although the path having the minimum number of movements is extracted, a path having a shortened movement time may be extracted. If each movement is simple and the movement time of the robot 100 is almost the same at any movement time, the movement time can be approximated with the number of movements. However, when complex movements are involved, the movement time is longer than a movement time in the case of simple movements. In such a case, it is difficult to approximate the movement time only with the number of movements. Thus, a path for achieving the minimum movement time and a path having a movement time with a small difference from the minimum movement time may be extracted. The movement time difference may be an absolute value in seconds, or a ratio in percentage.

The regrasping path calculation unit 260 calculates all paths having the minimum number of movements of the part 170 in the paths from the initial state to the final state of each combination. As described in the previous paragraph, the group of paths having the minimum number of movements of the part 170 does not necessarily include the path having the shortest movement time of the part 170. Therefore, the regrasping path calculation unit 260 may calculate the movement time, rather than the number of movements, to calculate all the paths in which the part 170 can move within a predetermined movement time from the shortest movement time. Here, the predetermined movement time may be an absolute value, for example, in seconds with respect to the shortest movement time, or a ratio in percentage of the shortest movement time. In addition, in this case, instead of FIG. 5 or in combination with the information on the number of movements in FIG. 5, the information on the movement time is obtained. Thus, the regrasping path calculation unit 260 calculates the regrasping path of the part 170 by using the combination calculated by the combination possibility calculation unit 250.

The orientation data 270 is set with both input orientation data being the orientation of the part 170 to be handled on the temporary placing stand 120 and alignment orientation data being the orientation to be finally aligned on the alignment stand 140. The orientation data 270 is a database of input orientation data and alignment orientation data on the part 170, and is stored in the storage apparatus 301.

The path group calculation unit 280 calculates and outputs a combination of appropriate paths as a path group from the regrasping path group leading from the designated input orientation to the final alignment state based on the data on orientation data 270 and the path calculated by the regrasping path calculation unit 260. Here, being appropriate means, for example, a combination of paths having the minimum number of teaching points. Expressed in another word, among combinations in which "○" is filled in FIG. 4, it is a combination of paths having minimum combination to be used. Thus, the path group calculation unit 280 calculates paths having the minimum number of teaching points from the regrasping path as a path group based on the input and alignment orientation data for designating the input orientation and alignment orientation of the part 170.

The program generation unit 290 generates and outputs a robot program for achieving the path group output by the path group calculation unit 280. It should be noted that one path group being a combination of appropriate paths output by the path group calculation unit 280 is not always calculated. The path group calculation unit 280 may output a plurality of path groups, and in this case, the program generation unit 290 generates and outputs robot programs according to the respective path groups. When a plurality of robot programs are generated, for example, the teaching operator may select which robot program to apply as appropriate.

The operations in the grasping method calculation unit 220, the stable orientation calculation unit 230, the combination possibility calculation unit 250, the regrasping path calculation unit 260, the path group calculation unit 280, and the program generation unit 290 are performed by the processor 300 in FIG. 3, and the program generation unit 290 outputs the program.

The robot program expresses the movement and the flow of signal processing of the robot 100, and for example, the target position of movement is generally treated as a position variable. This position variable is input in actual matching by teaching work. Therefore, for example, zero is input into all the position variables as an initial value, and the robot 100 cannot be actually operated.

In the present invention, position variables used in the program are shared if they have the same target positions even if they have different movement paths. According to the examples using FIG. 4 and FIG. 5, in the movement path for moving from the stable orientation 3 of the temporary placing stand 120 to the stable orientation 1 of the alignment stand 140 and the movement path for moving from the stable orientation 3 of the temporary placing stand 120 to the stable orientation 3 of the alignment stand 140, the target positions for grasping the stable orientation 3 of the temporary placing stand 120 are shared as a common teaching point in the grasping method 2 of the robot 100 because the target positions are included in both movement paths. In addition, the target position of the robot 100 when the part 170 is passed from the grasping method 1 of the robot 100 to the grasping method 4 of the regrasping jig 130, and the target position of the robot 100 when the part 170 is passed from the grasping method 4 of the regrasping jig 130 to the grasping method 1 of the robot 100 have only to have the same target positions though the work may be different, and are shared as a common teaching point.

Figure 6:
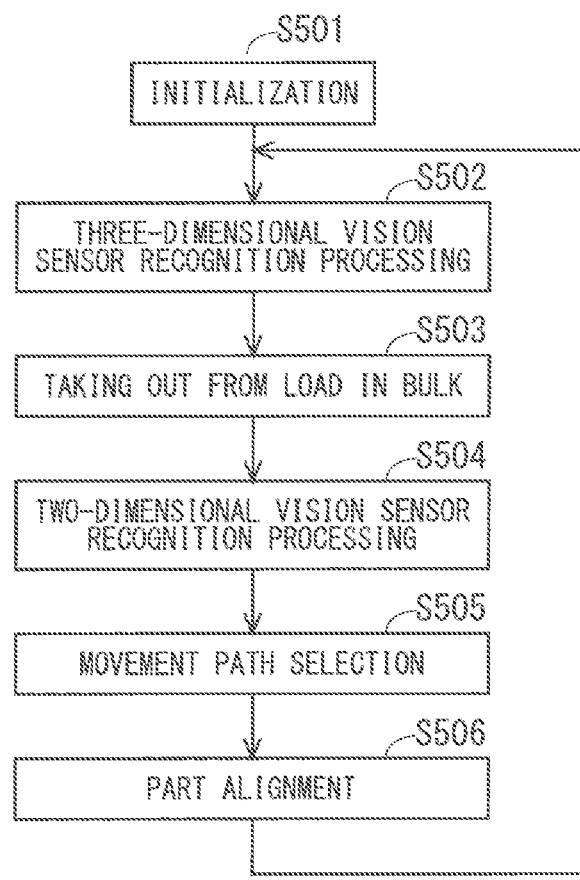
FIG. 6 is an example of a flowchart of a robot program output by the program generation unit according to the first embodiment of the present invention.

FIG. 6 is an example of a flowchart of a robot program output by the program generation unit 290. The initialization S501 is processing executed only once when the robot program is started. Processing such as initialization of variables and parameters and movement to an initial position is performed. Next, three-dimensional vision sensor recognition processing S502 is processing of recognizing parts 170 loaded in bulk on the parts supply stand 110 and calculating the target position orientation for the robot 100 to grasp the parts 170 with the three-dimensional vision sensor 150. In addition, taking out from bulk S503 is processing for taking out a part 170 from the parts 170 in the bulk state based on the result of the three-dimensional vision sensor recognition S502 to input the taken-out part to the temporary placing stand 120. To simplify the description, here, only one part 170 is assumed to be taken out.

The two-dimensional vision sensor recognition processing S504 is processing of recognizing the position orientation of the part 170 installed on the temporary placing stand 120 with the two-dimensional vision sensor 160. Next, the movement path selection S505 is processing of determining which stable orientation the part 170 is in from the recognition result of the position orientation of the part 170 to select a movement path from the temporary placing stand 120 to the alignment stand 140. The movement path selection S505 is processing of selecting a movement path starting from the stable orientation recognized by the two-dimensional vision sensor 160 among the path groups output by the path group calculation unit 280. Furthermore, the part alignment S506 is a series of processing for moving the part 170 on the temporary placing stand 120 to the alignment stand 140 in the selected movement path. After the part 170 is aligned in the part alignment S506, the process returns to the three-dimensional vision sensor recognition processing S502.

In this flowchart, to simplify the description, it is assumed that only one part 170 can be taken out to the temporary placing stand 120 from the bulk state. However, it is common to take out a plurality of parts 170 at one time in the processing of taking out from bulk S503. Because of this, the processing flow includes different variations including error recovery.

For example, on the premise that a plurality of parts 170 are taken out, there is also a flow in which the process returns to the two-dimensional vision sensor recognition processing S504 after the part alignment S506, and as a result of recognition, if the parts 170 do not exist on the temporary placing stand 120, the process returns to the three-dimensional vision sensor recognition processing S502. The present invention is mainly directed to generating a movement program of the part 170 after the position orientation of the part 170 is established, and any of the program configuration on the periphery of the movement program may be used.

Finally, the operator teaches the position variable used in the program output by the program generation unit 290, and sets the teaching point to which the robot 100 can move, thereby completing the operable robot program.

To simplify the description, the above description limits the robot system to be applied to and limits also the processing of each function in the present invention, but the present invention is not limited to this. For example, a robot system using a plurality of robots 100 may be used.

When a plurality of processes are performed with one robot 100 by using the regrasping jig 130 or the like, the average alignment time per part 170 is extended. For example, in FIG. 5, in order to align the stable orientation 1 of the temporary placing stand 120 with the stable orientation 3 on the alignment stand 140, since the regrasping jig 130 is used, four movements are required. If this process is executed by pipeline processing with two robots 100, the entire system can continue to align in the same period of time as when one robot 100 aligns in two movements. Thus, using a plurality of robots 100 allows the throughput of the system to be improved.

When a plurality of robots 100 are used as described above, the accessible destination (connection destination of the hand) of each robot 100 set in the system configuration data 240 is different from each other. In the configuration with one robot 100, the robot 100 can access all the stands (the parts supply stand 110, the temporary placing stand 120, and the alignment stand 140) and the regrasping jig 130, but in the case of forming a system in which a plurality of robots 100 divide work, the connection destination of the hand of each robot 100 is different from each other. In addition, since regrasping with another robot 100 also occurs, another robot 100 will also be added to the access destinations, in addition to the parts supply stand 110, the temporary placing stand 120, the alignment stand 140, and the regrasping jig 130. The system configuration data 240 needs information on these connection destinations of hands.

The combination possibility calculation unit 250 determines that the combination is "impossible" in the combination in which the access is impossible in consideration of the access destination of each hand. The processing of the regrasping path calculation unit 260 and the path group calculation unit 280 do not change. In addition, the program generation unit 290 outputs the programs of a plurality of robots 100, but the output is the same as the output of the processing of one robot 100.

In FIG. 1, as the robot 100 system to be applied, the three-dimensional vision sensor 150 and the two-dimensional vision sensor 160 are described as being fixed respectively on the parts supply stand 110 and the temporary placing stand 120. Irrespective of this, rather than using separate hardware, the processing of the two-dimensional vision sensor 160 may be implemented by the three-dimensional vision sensor 150. In addition, each camera (three-dimensional vision sensor 150, two-dimensional vision sensor 160, or the like) does not have to be fixed on a stand, but may be attached to a drive unit attached to above, or may be movably attached to the robot 100. The present invention is applicable regardless of the installation configuration of these cameras.

The combination possibility calculation unit 250 limits combinations for determining possibility based on the connection destination information on the hand included in the system configuration data 240. For example, in FIG. 4, the possibility in combination between the grasping methods of the hand attached to the robot 100 and the grasping methods of the hand attached to the regrasping jig 130 is not calculated.

In the case where there are a plurality of robots 100, the accessible destination differs depending on the connection destination robot 100, and the combination of not accessible (possibility of regrasping achievement) is naturally different from the case in FIG. 4. Thus, the determination of possibility may be performed with the combination based on all the grasping methods and stable orientations, ignoring the constraints of where they are connected. However, when the same hand is used by a plurality of apparatuses in the system, the number of combinations to be calculated may be smaller by performing calculation for each hand, rather than performing calculation on the combination possibility for each hand having a connection destination different from each other.

In this case, the system configuration information is used for the first time by the regrasping path calculation unit 260. This is because in the regrasping path calculation unit 260, since the accessible destination of the hand changes depending on the connection destination, information on the hand connection destination is required.

Hitherto, the method for generating a program including the movement path from the temporary placing stand 120 to the final alignment orientation has been described on all the stable orientations that the part 170 can achieve. There may be degrees of freedom for the movement path generated by the program.

First, there is a case where it is not necessary to handle all stable orientations derived by the stable orientation calculation unit 230. Depending on the part 170, there may be a stable orientation that is very unstable and does not actually appear on the temporary placing stand 120. For example, although a pen can be made to stand, its orientation is very unstable, and when the pen is roughly input to the temporary placing stand 120, its occurrence probability is negligibly small. Creating and adjusting programs for such orientations is a waste of work.

Therefore, the stable orientation calculation unit 230 may remove the very unstable stable orientation from the stable orientation. Even when a small external force is applied, the stable orientation transitioning to another stable orientation is excluded. For example, it is a stable orientation such as erecting an elongated shaped part such as a pen. In addition to the removal by the stable orientation calculation unit 230, it may be excluded in the orientation data 270.

In addition, an initial state of the movement path other than stable orientation may be set. Thus, a program including the movement path from the state where the robot 100 grasps the part 170 is output. For example, the program is used in a system in which the part 170 is grasped in a probabilistic manner and the grasping state is image-recognized.

Furthermore, not only one stable orientation but also a plurality of stable orientations or a plurality of grasping states may be set as the final state of the movement path. At this time, a program may be generated with a combination of all the initial and final states as a movement path, or a combination of the initial and final states to be handled may be set with the orientation data 270.

The form and the processing of each function of the robot system described in the present embodiment are an example, and the present invention is not limited to this. In addition, some functions can be supplemented by external data input input by the operator.

In addition, presenting the operator with the path group output by the path group calculation unit 280 allows the operator to select and correct the movement path. The output result and the candidate of other functions may also be presented to the operator, and the operator may select or correct them.

As described above, the robot program generation apparatus of the present invention includes: a grasping method calculation unit 220 for outputting a grasping method of the part 170 from three-dimensional shape data on a hand and the part 170; a stable orientation calculation unit 230 for calculating an orientation of part 170 stabilized on a flat surface from the three-dimensional shape data to output the calculated result as a stable orientation of the part 170; system configuration data 240 including at least connection destination information on the hand; a combination possibility calculation unit 250 for determining hand interference in at least any one combination of the combination between two grasping methods and the combination between one of the grasping methods and one of the stable orientations of the part 170 from the grasping method of the part 170 and the stable orientation of the part 170 to output combination possibility; a regrasping path calculation unit 260 for calculating and outputting all the regrasping paths in at least any one combination of the grasping method of the part 170 and the stable orientation from the combination possibility; a path group calculation unit 280 for outputting as a path group a combination of paths having the minimum number of teaching points from the regrasping path based on orientation data 270 for designating the input orientation and the final alignment orientation of the part 170; and a program generation unit 290 for outputting a robot program from the path group.

In other words, an apparatus for generating a robot program of the present invention includes: a stable orientation calculation unit to calculate a stable orientation in which, from three-dimensional shape data of a part, the part is stabilized on a flat surface; a grasping method calculation unit to calculate a grasping method for grasping the part with a hand from three-dimensional data of the hand and the three-dimensional shape data; from a combination group of the grasping method by the robot, the grasping method by other than the robot, and the stable orientation, based on system configuration data including information on a connection destination of the hand, the stable orientation, and the grasping method, a combination possibility calculation unit to calculate a combination in which the hand does not interfere; a regrasping path calculation unit to calculate a regrasping path of the part by using the combination calculated by the combination possibility calculation unit; a path group calculation unit to calculate a path having the minimum number of teaching points from the regrasping path as a path group based on orientation data for designating an input orientation and an alignment orientation of the part; and a program generation unit to generate a program of the robot based on the path group. Therefore, sharing the teaching points in a plurality of movement paths allows a robot program with the small number of teaching points to be generated. As a result, it is possible to reduce the number of adjustment steps of the teaching work by the operator. Thus, the combination possibility calculation unit calculates at least one combination in which the hands do not interfere from the combination group of any one of the stable orientation and the grasping method, and the grasping method.

Second Embodiment

In the first embodiment, the robot program is generated, and then the operator teaches the teaching point, but data on the teaching point may be generated by the program. Here, differences from the first embodiment will be mainly described. The portion where the description is insufficient has the same configuration as that in the first embodiment.

Figure 7:
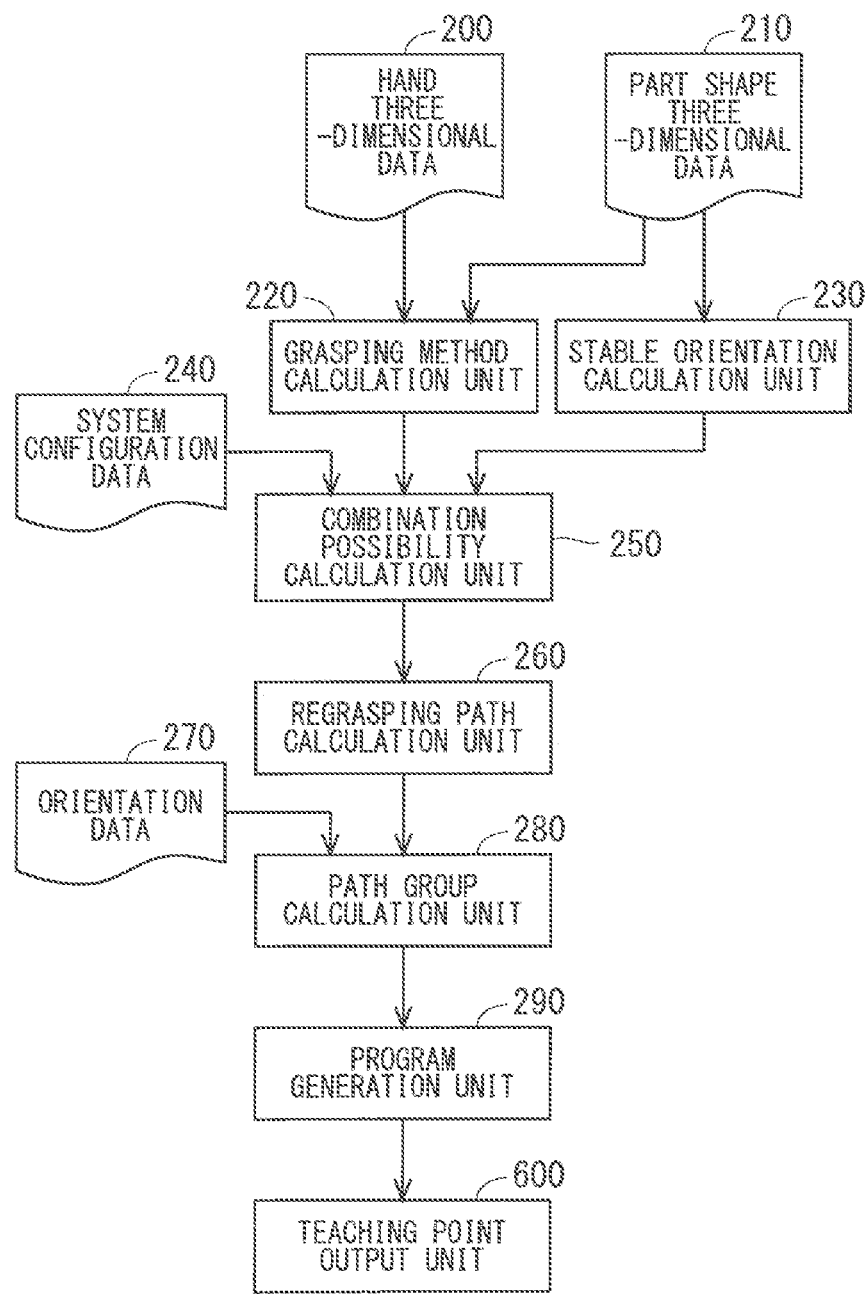
FIG. 7 is a functional configuration diagram of a program generation apparatus according to a second embodiment of the present invention.

FIG. 7 is a functional configuration diagram of a program generation apparatus according to a second embodiment. To simplify the description, first, the case of one robot 100 will be described. It should be noted that in the drawing, the same reference numerals are assigned to the same or corresponding parts, which is common to the whole text of the description and all the drawings. Furthermore, the form of the component which appears in the whole description is only an illustration and is not limited to these descriptions.

In addition to the information of the first embodiment, in the system configuration data 240, position information of the temporary placing stand 120, the alignment stand 140, and the regrasping jig 130 is set. The system configuration data 240 includes, in addition to the information on the connection destination of the hand, data on the work position at which the hand works. The position information is set based on the coordinate system of the robot 100 and the relative position from the base position of the robot 100.

A teaching point output unit 600 calculates the teaching point used in the program output by the program generation unit 290 based on the coordinate system of the robot 100. First, it is extracted from the path information that the teaching point of the output program is the work at which position. The work position of the robot 100 refers to the temporary placing stand 120, the alignment stand 140, and the regrasping jig 130. When the part 170 is installed in the positional information on the work position, position orientation data on the robot 100 when the grasping method set in the path information is achieved is calculated and output as a teaching point. It should be noted that the teaching point output unit 600 is operated by the processor 300, and the teaching point output unit 600 outputs the teaching point.

Here, when the position orientation of the hand is to be achieved, there are a plurality of position orientations of the robot 100, and the position orientation data on the robot 100 is not always be determined uniquely. In this case, any one of the position orientation of the robot 100 that achieves the position of the hand may be output as a teaching point, or may be presented so that the operator can select from a plurality of candidate teaching points.

When the work position is not in a flat surface but in the regrasping jig 130, the installation position orientation of the part 170 is determined based on the position of the regrasping jig 130 and the grasping method of the regrasping jig 130.

Next, when a plurality of robots 100 are used, the installation position of each robot 100 is included in the system configuration data 240, and teaching point data is calculated with a relative position from the robot 100. In addition, when delivery is performed between the robots 100, the position orientation of at least any one robot 100 at the time of delivery work is set with the system configuration data 240.

In FIG. 7, although the teaching point output unit 600 outputs the teaching point data after the program generation unit 290 generates the program, the teaching point output unit 600 may output the teaching point data before the program generation unit 290 generates the program. It is possible for the operator to output teaching point data by setting the work position and the grasping method. Therefore, after the grasping method is set by the grasping method calculation unit 220, it is possible to output the teaching point data at any request timing from the operator.

As described above, according to the present embodiment, providing a movement path teaching point output unit 600 that sets data on work position in the system configuration data 240 to calculate the position of the hand for achieving the grasping method assuming that the part 170 is in the work position to output teaching point data, has an effect that labor of teaching work can be saved.

In other words, an apparatus for generating a robot program of the present invention includes: a stable orientation calculation unit to calculate a stable orientation in which, from three-dimensional shape data of a part, the part is stabilized on a flat surface; a grasping method calculation unit to calculate a grasping method for grasping the part with a hand from three-dimensional data of the hand and the three-dimensional shape data; from a combination group of the grasping method by the robot, the grasping method by other than the robot, and the stable orientation, based on system configuration data including information on a connection destination of the hand, the stable orientation, and the grasping method, a combination possibility calculation unit to calculate a combination in which the hand does not interfere; a regrasping path calculation unit to calculate a regrasping path of the part by using the combination calculated by the combination possibility calculation unit; a path group calculation unit to calculate a path having the minimum number of teaching points from the regrasping path as a path group based on orientation data for designating an input orientation and an alignment orientation of the part; and a program generation unit to generate a program of the robot based on the path group. Therefore, a robot program, sharing the teaching points in a plurality of movement paths, with the small number of teaching points can be generated. In addition, since the teaching points are output, the number of adjustment steps of the operator can be reduced. It should be noted that the combination possibility calculation unit calculates at least one combination in which the hands do not interfere from the combination group of any one of the stable orientation and the grasping method, and the grasping method.

Third Embodiment

Although the data on the teaching point is generated in the second embodiment, the teaching point may be output by determining whether or not the robot 100 can take the position orientation at the teaching point. This is because sometimes the robot 100 cannot take (cannot achieve) the teaching position orientation. Here, differences from the first and second embodiments, in particular, differences from the second embodiment, will be mainly described. The portion where the description is insufficient has the same configuration as that in the first and second embodiments.

Even if the first and second embodiments are attempted to be performed, sometimes the robot 100 cannot take the teaching position orientation. As an easy-to-understand example, sometimes the part 170 on the stand is so far that the hand of the robot 100 cannot reach the part 170. In addition, sometimes the joint angle of the robot 100 is an angle that cannot be achieved. Even if the robot 100 has six degrees of freedom, not all joints have a 360 degree movable area. In addition, there is also a combination of indirect angles such that a part of the robot 100 enters the main body of the robot 100. Therefore, depending on the joints of the robot 100, the movable region is normally limited. In addition, this movable area is different for each robot 100, so that the movable area is a constraint unique to the robot 100 scheduled to be used. Furthermore, there may be an additional constraint of the operable area due to external environments such as floors and walls. As described above, sometimes the robot 100 cannot take (cannot achieve) the teaching position orientation at the teaching point.

Figure 8:
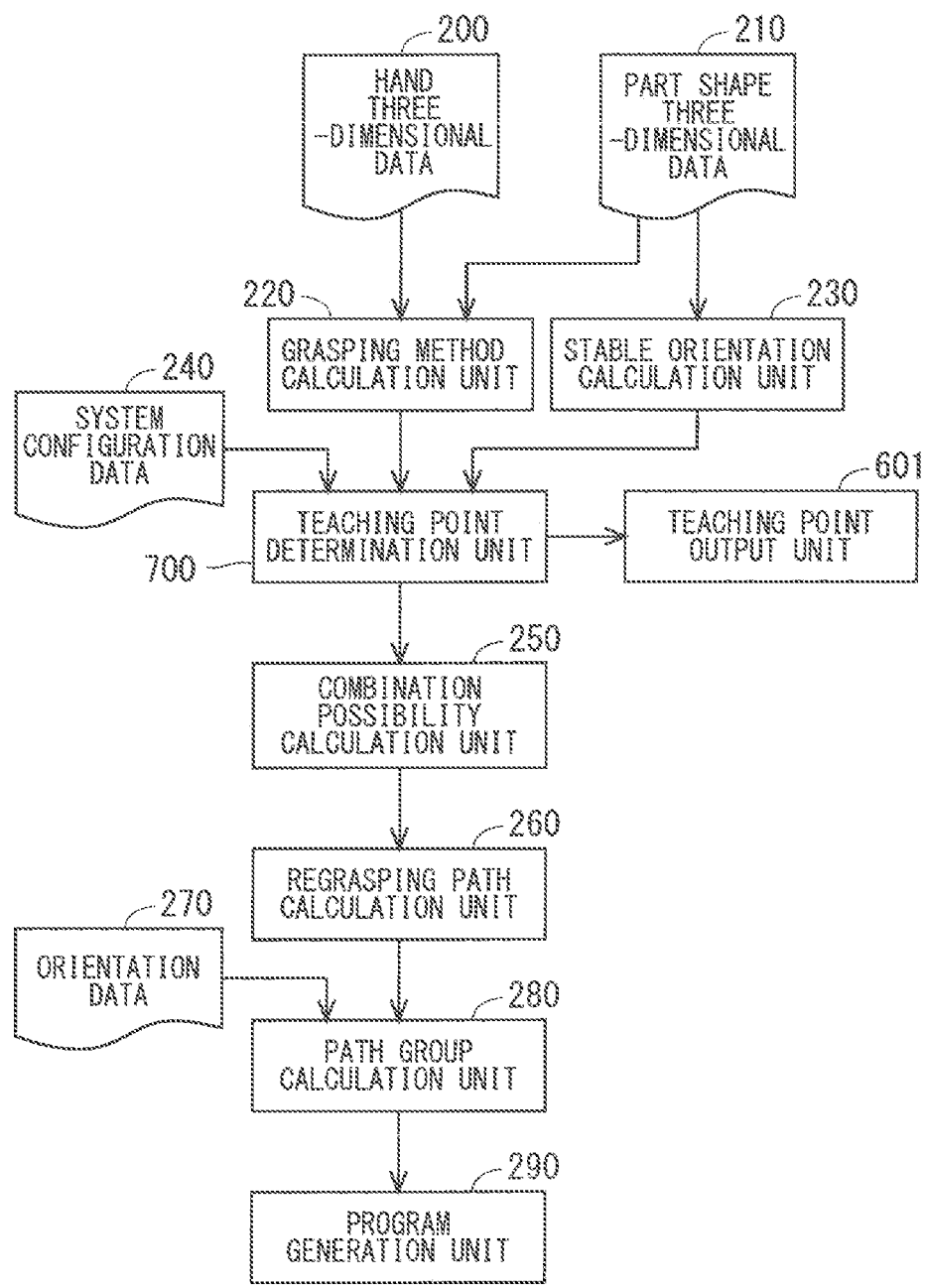
FIG. 8 is a functional configuration diagram of a program generation apparatus according to a third embodiment of the present invention.

FIG. 8 is a functional configuration diagram of a program generation apparatus according to a third embodiment. Based on the information related to the robot 100 to be used, a teaching point determination unit 700 determines whether or not the robot 100 can achieve the teaching position orientation at the position serving as the teaching point. It should be noted that the teaching point determination unit 700 may perform in or after the process of the combination possibility calculation unit 250 in FIG. 8.

However, if the process of the teaching point determination unit 700 is before the process of the combination possibility calculation unit 250, since the determination result of the teaching point determination unit 700 can be reflected also in the process of the combination possibility calculation unit 250, it is possible to further save labor of the teaching work by the operator. In addition, a teaching point output unit 601 may be anywhere if it is in or after the process of the teaching point determination unit 700. The information related to the robot 100 includes system configuration data 240 including information on the connection destination of the hand and data on the work position at which the hand works, the stable orientation, and the grasping method.

Information on the robot 100 to be used, at least information on the connection destination of the hand, and data on the work position where the hand works are set in the system configuration data 240, and the teaching point determination unit 700 determines the possibility as to whether or not the teaching point can be achieved. In addition to this, the system configuration data 240 may include constraints unique to the robot 100 scheduled to be used, and constraints due to the external environment if needed.

The determination result of the teaching point determination unit 700 is output by the teaching point output unit 601. As the determination result of the teaching point determination unit 700, for example, if the teaching point cannot be achieved ("impossible"), the teaching point output unit 601 outputs an error to the operator, and if the teaching point can be achieved ("possible"), the teaching point is output. It should be noted that the teaching point determination unit 700 and the teaching point output unit 601 are operated by the processor 300.

As described above, the system configuration data 240 includes information on the connection destination of the hand and data on the work position at which the hand works, and the teaching point determination unit 700 for determining the possibility as to whether or not the robot 100 can take the teaching position orientation at a position to be the teaching point when the part 170 is at the work position is provided, so that the feasibility of the system configuration can be verified in advance.

Here, an example of the determination method of the teaching point determination unit 700 will be described in detail. FIGS. 9A to 9I are diagrams illustrating an example of the part 170 at the work position (for example, the temporary placing stand 120) being a flat surface. FIGS. 9A to 9I each is an example of a state in which the part 170 on the temporary placing stand 120 is viewed from above, and from FIG. 9A to FIG. 9I show the part 170 which is rotated by 45 degrees to the right on an axis (normal line) perpendicular to the flat surface on the temporary placing stand 120 being a flat surface. One round rotation of the part 170 goes to the same position in FIG. 9A and FIG. 9I. FIG. 9A and FIG. 9I have the same installation angle rotated on the flat surface.

While rotating the part 170 at the work position designated by the system configuration data 240, the teaching point determination unit 700 determines the feasibility of the teaching position orientation by the robot 100 at the position serving as the teaching point. Specifically, when the part 170 is input to the temporary placing stand 120, as shown in FIGS. 9A to 9I, the part 170 is rotated on an axis (normal line) perpendicular to the plane on the flat surface. This is because in order to determine whether or not the robot 100 can always achieve the position orientation for grasping the part 170, it is necessary to rotate and determine the part 170 on the flat surface. Whether or not the grasping method can be achieved at the installation angle of the entire range rotated on the flat surface determines the possibility.

If the part 170 is at a work position serving as a flat surface, the teaching point determination unit determines that it is "possible" when the robot 100 can take the teaching position orientation in the entire range in which the part 170 is rotated on an axis (normal line) perpendicular to the plane. If the determination is possible, since the robot 100 can take the teaching position orientation in the entire range, in the example of FIGS. 9A to 9I, the robot 100 can naturally take the teaching position orientation at any installation angle from FIG. 9A to FIG. 9I. Thus, determining the feasibility of the position orientation of the robot 100 to be used allows the effect that the feasibility of the system configuration can be verified in advance to be obtained.

Thus, an apparatus for generating a robot program of the present invention includes: a stable orientation calculation unit to calculate a stable orientation in which, from three-dimensional shape data of a part, the part is stabilized on a flat surface; a grasping method calculation unit to calculate a grasping method for grasping the part with a hand from three-dimensional data of the hand and the three-dimensional shape data; from a combination group of the grasping method by the robot, the grasping method by other than the robot, and the stable orientation, based on system configuration data including information on a connection destination of the hand, the stable orientation, and the grasping method, a combination possibility calculation unit to calculate a combination in which the hand does not interfere; a regrasping path calculation unit to calculate a regrasping path of the part by using the combination calculated by the combination possibility calculation unit; a path group calculation unit to calculate a path having the minimum number of teaching points from the regrasping path as a path group based on orientation data for designating an input orientation and an alignment orientation of the part; and a program generation unit to generate a program of the robot based on the path group. It should be noted that the combination possibility calculation unit calculates at least one combination in which the hands do not interfere from the combination group of any one of the stable orientation and the grasping method, and the grasping method.

In particular, if the part is at a work position serving as a flat surface, the teaching point determination unit determines that it is "possible" when the robot can take the teaching position orientation in the entire range in which the part is rotated on an axis perpendicular to the flat surface. With these, it is possible to generate a robot program with a small number of teaching points in which the teaching points are shared among a plurality of movement paths. In addition, determining the feasibility of the position orientation of the robot to be used allows the practicability of the system configuration to be determined.

Fourth Embodiment

In the third embodiment, if the part 170 is at a work position serving as a flat surface, the teaching point determination unit 700 determines that it is "possible" when the robot 100 can take the teaching position orientation in the entire range in which the part 170 is rotated on an axis perpendicular to the flat surface. In the fourth embodiment, if the part 170 is within the range of a predetermined installation angle rather than in the entire range in which the part is rotated on an axis perpendicular to the flat surface, when the robot 100 can take the teaching position orientation, a program of combining the grasping methods in which grasping can be achieved may be generated.

Figure 10:
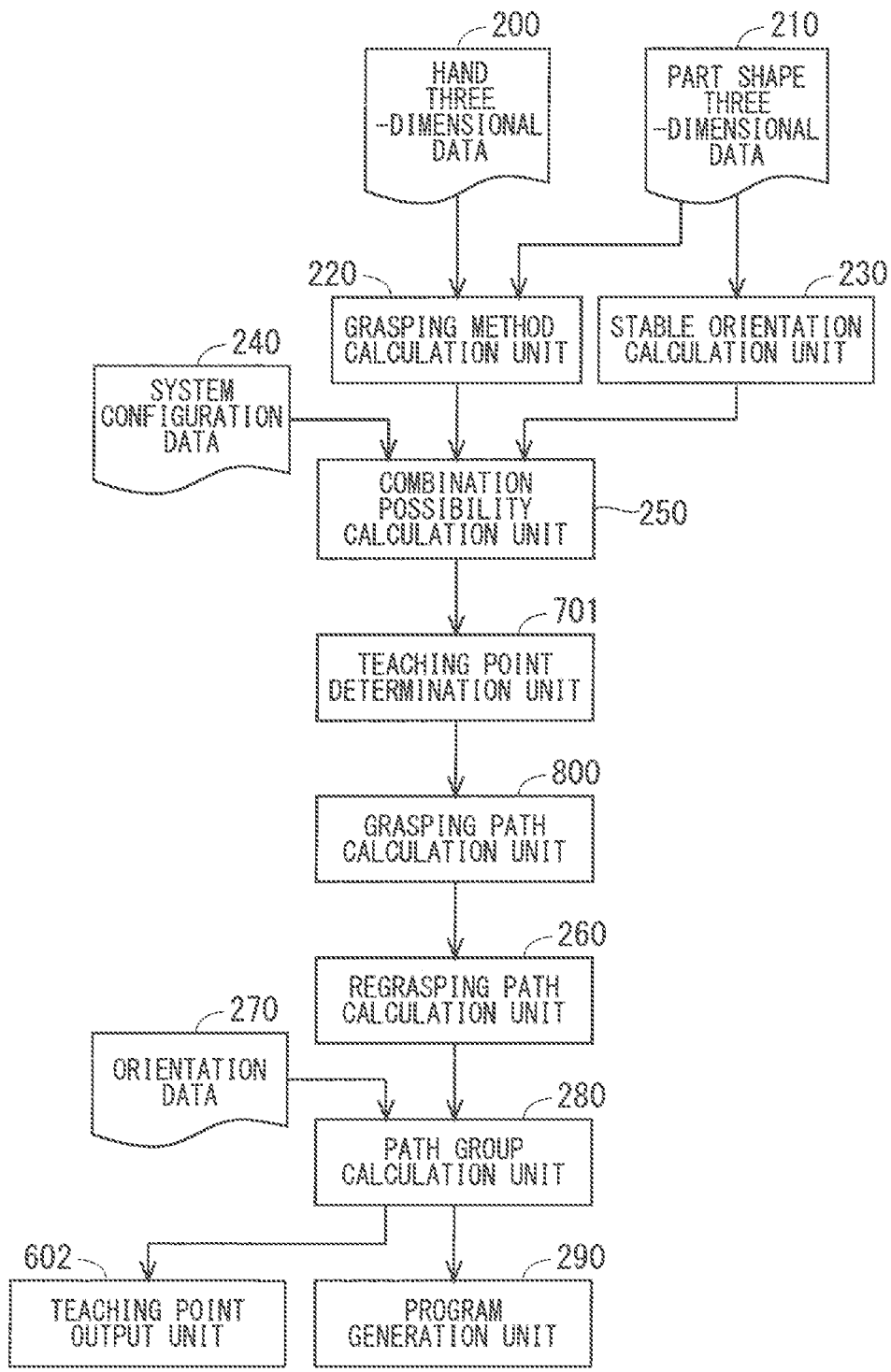
FIG. 10 is a functional configuration diagram of a program generation apparatus according to a fourth embodiment of the present invention.

FIG. 10 is a functional configuration diagram of a program generation apparatus according to a fourth embodiment. Unlike the teaching point determination unit 700, if the part 170 is within the range of a predetermined installation angle rather than in the entire range in which the part is rotated on an axis perpendicular to the flat surface, when the robot 100 can take the teaching position orientation at the position to be the teaching point, a teaching point determination unit 701 determines that it is "possible" within the range of the predetermined installation angle. For other things, there is no difference between the teaching point determination unit 701 and the teaching point determination unit 700.

For example, when the part 170 is rotated on the temporary placing stand 120 for each combination of the grasping method and the stable orientation, the rotation range of the part 170 in which the robot 100 can achieve the grasping method is calculated. If the part 170 is at a work position serving as a flat surface, the teaching point determination unit 701 rotates the part 170 on an axis (normal line) perpendicular to the flat surface, calculates the range of the installation angle at which the robot 100 can take the teaching position orientation at the position to be the teaching point, and determines that it is "possible".

For example, in the example of FIGS. 9A to 9I, in the case of FIG. 9B to FIG. 9D and FIG. 9F to FIG. 9H, if the robot 100 can take the teaching position orientation by rotating the part 170 on an axis perpendicular to the flat surface, the teaching point determination unit 701 determines that it is "possible" within the range of the corresponding installation angle. Thus, the range of the installation angle may correspond to be possible in a plurality of ranges even within 360 degrees. In addition, although the diagram is shown in units of 45 degrees in the example in FIGS. 9A to 9I, this is merely exemplary, and when the range of the installation angle is determined, a finer unit or a larger unit can be set.

A grasping path calculation unit 800 calculates a path for grasping with a hand the part 170 in the range of the installation angle to be determined to be possible by the teaching point determination unit 701. Since the installation angles at which the robot 100 can achieve the position orientation can be specified at the installation angles of the entire range rotated on the flat surface for each stable orientation of the part 170, it is possible to calculate a combination of grasping methods.

Regarding the part 170 at the work position serving as a flat surface (for example, temporary placing stand 120), the grasping path calculation unit 800 calculates a path for grasping with the hand the part 170 at an installation angle at which the determination result of the teaching point determination unit 701 shows "possible", to calculate the grasping path. With this, if the part 170 is at the installation angle within a predetermined range, without uniformly determining that it is "impossible", a program can be generated that selects a movement path using a graspable grasping method.

A teaching point output unit 602 has the same function as the teaching point output units 600 and 601, and calculates and outputs a teaching point based on the coordinate system of the robot 100. In addition, the teaching point output unit 602 may be anywhere in or after the process of the teaching point determination unit 701. It should be noted that the teaching point determination unit 701, the grasping path calculation unit 800, and the teaching point output unit 602 are operated by the processor 300.

As described above, if the part is in a work position serving as a flat surface, since the teaching point determination unit calculates the installation angle at which the part is rotated on an axis perpendicular to the flat surface to be determined that it is "possible" and includes a grasping path calculation unit for calculating the path for grasping with the hand the part at the installation angle to be determined as "possible" by the teaching point determination unit, even if there is a case that cannot be coped with by only one grasping method when the part 170 is rotated at the work position serving as a flat surface, the teaching point determination unit can output a program for combining a plurality of grasping methods to cope with the case.

Thus, an apparatus for generating a robot program of the present invention includes: a stable orientation calculation unit to calculate a stable orientation in which, from three-dimensional shape data of a part, the part is stabilized on a flat surface; a grasping method calculation unit to calculate a grasping method for grasping the part with a hand from three-dimensional data of the hand and the three-dimensional shape data; from a combination group of the grasping method by the robot, the grasping method by other than the robot, and the stable orientation, based on system configuration data including information on a connection destination of the hand, the stable orientation, and the grasping method, a combination possibility calculation unit to calculate a combination in which the hand does not interfere; a regrasping path calculation unit to calculate a regrasping path of the part by using the combination calculated by the combination possibility calculation unit; a path group calculation unit to calculate a path having the minimum number of teaching points from the regrasping path as a path group based on orientation data for designating an input orientation and an alignment orientation of the part; and a program generation unit to generate a program of the robot based on the path group. It should be noted that the combination possibility calculation unit calculates at least one combination in which the hands do not interfere from the combination group of any one of the stable orientation and the grasping method, and the grasping method.

In particular, if the part is in a work position serving as a flat surface, since the teaching point determination unit calculates the installation angle at which the part is rotated on an axis perpendicular to the flat surface and the robot can take the teaching position orientation, and includes a grasping path calculation unit for calculating the path for grasping with the hand the part when there is a part at the installation angle at which the teaching point determination unit can take the teaching position orientation, even if there is a case that cannot be coped with by only one grasping method when the part is rotated at the work position serving as a flat surface, the teaching point determination unit can output a program for combining a plurality of grasping methods to cope with the case.

Fifth Embodiment

The fifth embodiment is an embodiment obtained by adding an object for generating a program for requiring maintenance work to any one of the first to fourth embodiments after limiting the moving speed of the hand depending on the operational condition of the robot.

In the alignment system of parts 170 loaded in bulk, it is difficult to continue to operate without work failure such as dropping of the part 170, and it is necessary to perform maintenance work at an appropriate timing. In the handling of the parts 170 loaded in bulk, the uncertainty of the position orientation of the parts 170 is high, and there is also a high possibility that the defective parts 170 are mixed. Therefore, it is difficult to achieve a work success rate close to 100% as in general equipment.

Therefore, the operation of performing recovery work by the operator every time the work fails is inefficient, and a system in which a certain amount of failure is tolerated to continue the operation is requested. Here, the tolerable failure refers to a failure that does not hinder the work of aligning other parts 170, such as dropping a part 170 during movement.

However, problems occur if too many parts 170 are dropped and piled up. In addition, from the viewpoint of part 170 management, it is important to grasp the type and the number of dropped parts 170. Furthermore, if it is known that in which process in the system the part 170 is dropped, recovery of the parts 170 by the maintenance operator is also facilitated.

FIG. 11 is a functional configuration diagram of a program generation apparatus according to a fifth embodiment. Here, a maintenance work program generation unit 900 and operational condition data 910 are added to the first embodiment being the basic embodiment. The operational condition data 910 is a database relating to the operational condition of the robot, and is stored in the storage apparatus 301. In addition, the operation in the maintenance work program generation unit 900 is performed by the processor 300, and the maintenance work program generation unit 900 outputs a program.

The maintenance work program generation unit 900 generates and outputs a program for requesting maintenance work to the robot program output by the program generation unit 290. The output of the maintenance work program generation unit 900 may be added to the program generated by the program generation unit 290 to output the program. The program to be added is to limit the moving speed of the robot 100 to a safety speed and to request maintenance work when the operation history satisfies a certain condition.

Here, the certain condition of the operation history is, for example, occurrence of the designated number of work failures since the previous maintenance work was performed. The work failure can be detected by, for example, recognition of the temporary placing stand 120 by the two-dimensional vision sensor 160, monitoring of the grasping part 170 by the force sensor of the robot 100, confirmation of the alignment part 170 of the alignment stand 140, or the like. In addition, the safety speed is, for example, a moving speed at the time of teaching work such as a hand synthetic speed of 250 mm/sec or less, and is a speed at which the operator can easily avoid a collision with the robot 100.

Thus, limiting the moving speed of the robot 100 allows safely performing maintenance work without stopping the operation of the robot 100. In addition, the request for maintenance work is a request for the maintenance operator to remove the dropped part 170. At this time, information such as the type of the part 170 at the time of detecting a work failure and an assumed falling place may be added. After the maintenance work is completed, the limitation of the moving speed may be released and the operation may be continued.

An apparatus for generating a robot program of the present invention includes: a stable orientation calculation unit to calculate a stable orientation in which, from three-dimensional shape data of a part, the part is stabilized on a flat surface; a grasping method calculation unit to calculate a grasping method for grasping the part with a hand from three-dimensional data of the hand and the three-dimensional shape data; from a combination group of the grasping method by the robot, the grasping method by other than the robot, and the stable orientation, based on system configuration data including information on a connection destination of the hand, the stable orientation, and the grasping method, a combination possibility calculation unit to calculate a combination in which the hand does not interfere; a regrasping path calculation unit to calculate a regrasping path of the part by using the combination calculated by the combination possibility calculation unit; a path group calculation unit to calculate a path having the minimum number of teaching points from the regrasping path as a path group based on orientation data for designating an input orientation and an alignment orientation of the part; a program generation unit to generate a program of the robot based on the path group; and a maintenance work program generation unit to limit a moving speed of the robot based on operational condition data of the robot to generate a maintenance work program for requesting maintenance work of the robot. Therefore, the operation efficiency of the robot system can be enhanced as compared with the case where the maintenance operator confirms the maintenance necessity from the operational condition and stops and maintains the robot system. It should be noted that the combination possibility calculation unit calculates at least one combination in which the hands do not interfere from the combination group of any one of the stable orientation and the grasping method, and the grasping method.

EXPLANATION OF REFERENCE SIGNS

100: robot
110: parts supply stand
120: temporary placing stand
130: regrasping jig
140: alignment stand
150: three-dimensional vision sensor
160: two-dimensional vision sensor
170: parts
200: hand three-dimensional data
210: part shape three-dimensional data
220: grasping method calculation unit
230: stable orientation calculation unit
240: system configuration data
250: combination possibility calculation unit
260: regrasping path calculation unit
270: orientation data
280: path group calculation unit
290: program generation unit
300: processor
301: storage apparatus
600, 601, 602: teaching point output unit
700, 701: teaching point determination unit
800: grasping path calculation unit
900: maintenance work program generation unit
910: operational condition data

The invention claimed is:

1. An apparatus for generating a robot program, the apparatus comprising:
a processor configured to execute a program; and
a memory to store the program which, when executed by the processor, causes the processor to perform processes comprising:
calculating a stable orientation in which, from three-dimensional shape data of a part, the part is stabilized on a flat surface;
calculating a grasping method for grasping the part with a hand from three-dimensional data of the hand and the three-dimensional shape data;
calculating, from a combination group of the grasping method by a robot, the grasping method by other than the robot, and the stable orientation, based on system configuration data including information on a connection destination of the hand, the stable orientation, and the grasping method, the combination in which the hand does not interfere;
calculating all regrasping paths having the minimum number of movements of the part by using the calculated combination;
calculating a path having the minimum number of teaching points by sharing the teaching points in the regrasping path as a path group based on orientation data for designating an input orientation and an alignment orientation, the input orientation being the orientation of the part to be handled on the temporary placing stand, the alignment orientation being the orientation of the part to be aligned on the alignment stand; and
generating an alignment program for regrasping parts supplied in bulk by using the robot to align on the alignment stand based on the path group.

2. The apparatus for generating a robot program according to claim 1, wherein
the system configuration data includes data on a work position at which the hand works, and
the memory further causes the processor to calculate a position of the hand when the part is at the work position to output a position of the teaching point.

3. The apparatus for generating a robot program according to claim 2, wherein the processor is further configured to limit a moving speed of the robot based on operation condition data on the robot to generate a maintenance work program for requesting a maintenance work of the robot.

4. The apparatus for generating a robot program according to claim 1, wherein
the system configuration data includes data on a work position at which the hand works, and
the memory further causes the processor to determine possibility as to whether or not the robot can take a teaching position orientation at a position serving as the teaching point when the part is at the work position.

5. The apparatus for generating a robot program according to claim 4, wherein the processor is further configured to limit a moving speed of the robot based on operation condition data on the robot to generate a maintenance work program for requesting a maintenance work of the robot.

6. The apparatus for generating a robot program according to claim 4, wherein, if the part is at the work position serving as a flat surface, the processor determines to be possible when the robot can take the teaching position orientation in an entire range in which the part is rotated on an axis perpendicular to the flat surface.

7. The apparatus for generating a robot program according to claim 6, wherein the processor is further configured to limit a moving speed of the robot based on operation condition data on the robot to generate a maintenance work program for requesting a maintenance work of the robot.

8. The apparatus for generating a robot program according to claim 4, wherein
when the part is at the work position serving as a flat surface, the processor calculates an installation angle at which the robot can take the teaching position orientation by rotating the part on an axis perpendicular to the flat surface, and the memory further causes the processor to calculate as a path for grasping the part with the hand when the part is at the calculated installation angle at which the robot can take the teaching position orientation.

9. The apparatus for generating a robot program according to claim 8, wherein the processor is further configured to limit a moving speed of the robot based on operation condition data on the robot to generate a maintenance work program for requesting a maintenance work of the robot.

10. The apparatus for generating a robot program according to claim 1, wherein:
the memory further causes the processor to limit a moving speed of the robot based on operation condition data on the robot to generate a maintenance work program for requesting a maintenance work of the robot.

11. A method for generating a robot program, the method comprising:
calculating a plurality of stable orientations in which, from three-dimensional shape data of a part, the part is stabilized on a flat surface;
calculating a grasping method for grasping the part with a hand from three-dimensional data of the hand and the three-dimensional shape data;
from a combination group of the grasping method by a robot, the grasping method by other than the robot, and the stable orientation, based on system configuration data including information on a connection destination of the hand, the stable orientation, and the grasping method, calculating the combination in which the hand does not interfere;
calculating all regrasping of the part by using the calculated combination;
calculating a path having the minimum number of teaching points by sharing the teaching points in the regrasping path as a path group based on orientation data for designating an input orientation and an alignment orientation, the input orientation being the orientation of the part to be handled on the temporary placing stand, the alignment orientation being the orientation of the part to be aligned on the alignment stand; and
generating a program for regrasping parts supplied in bulk by using a robot to align on the alignment stand based on the path group.

\* \* \* \* \*